United States Patent [19]

Nagamura et al.

[11] Patent Number: 5,617,740

[45] Date of Patent: Apr. 8, 1997

[54] METHOD OF PRODUCING ULTRA HIGH PURITY MONOSILANE AND APPARATUS THEREFOR

[75] Inventors: Takashi Nagamura; Shinji Tomita, both of Hyogo-ken, Japan

[73] Assignee: L'air Liquide, Societe Anonyme Pour L'Etude Et L'Exploitation Des Procedes Georges Claude, Paris Cedex, France

[21] Appl. No.: 553,532

[22] PCT Filed: Mar. 22, 1995

[86] PCT No.: PCT/EP95/01084

§ 371 Date: Dec. 27, 1995

§ 102(e) Date: Dec. 27, 1995

[87] PCT Pub. No.: WO95/26927

PCT Pub. Date: Oct. 12, 1995

[30] Foreign Application Priority Data

Mar. 30, 1994 [JP] Japan .................................. 6-082618

[51] Int. Cl.$^6$ ...................................... F25J 3/00
[52] U.S. Cl. ................................. 62/620; 62/905
[58] Field of Search ....................... 62/620, 905

[56] References Cited

U.S. PATENT DOCUMENTS

| 4,755,201 | 7/1988 | Eschwey et al. ................ 62/637 |
| 5,499,506 | 3/1996 | Nagamura et al. ................ 62/620 |

*Primary Examiner*—Ronald C. Capossela
*Attorney, Agent, or Firm*—Young & Thompson

[57] ABSTRACT

A method and unit for easily and continuously producing high pressure gaseous monosilane and high pressure liquid monosilane, each having an ultra high purity. In the ultra high purity monosilane producing method, a feed monosilane gas is pressurized, cooled down and subjected to a gas-liquid phase separation. The separated gas phase is introduced to a lower rectification column 1 so as to be rectified. The gas obtained through this rectification is introduced to an upper rectification column 2 so as to be rectified, wherein a gaseous monosilane product or liquid monosilane product having an ultra high purity is taken out of the bottom portion of the upper rectification column.

6 Claims, 1 Drawing Sheet

METHOD OF PRODUCING ULTRA HIGH PURITY MONOSILANE AND APPARATUS THEREFOR

FIELD OF THE INVENTION

The present invention relates to a method of producing ultra high purity monosilane and apparatus therefor, and particularly to an ultra high purity monosilane producing method which comprises liquefying and rectifying a feed monosilane gas, thereby producing high pressure monosilane gas and high pressure monosilane liquid, each having an ultra high purity, which are free from hydrogen having a boiling point lower than that of monosilane and chlorides having boiling points higher than that of monosilane, and an apparatus therefor.

BACKGROUND OF THE INVENTION

Monosilane gas is generally indispensable for the manufacture of ultra LSIs, solar batteries, photosensitive materials and the like.

A known method for producing monosilane gas is that disclosed in the official gazette of Japanese Patent Publication No. 3,806/1989.

Such monosilane gas preferably should have a high purity, for instance, of 99.9999% or more. However, a preferred method for producing such high purity monosilane gas and a preferred unit therefor have not yet been developed.

The present invention is intended to achieve the aforementioned purpose.

SUMMARY OF THE INVENTION

The ultra high purity monosilane producing method according to the present invention is characterized by comprising: pressurizing, cooling down and gas-liquid separating a feed monosilane gas; introducing the separated gas to the middle stage of a lower rectification column and rectifying the pressurized gas in the lower rectification column; introducing the gas resulted from this rectification to the middle stage of an upper rectification column and rectifying the same gas there; and taking out a high pressure monosilane gas product or liquid monosilane product having an ultra high purity which is resulted from this rectification, from the bottom portion of said upper rectification column.

The ultra high purity monosilane producing method according to the present invention is characterized by further comprising: a step of warming the liquid reservoired in the bottom portion of said lower rectification column by means of a reboiler, whereby low boiling point components contained in said liquid are gasified so as to be recovered to the lower rectification column.

The ultra high purity monosilane producing unit according to the present invention is characterized by comprising: a lower rectification column with a reboiler-condenser disposed in its top portion and a condenser for cooling use disposed below the reboiler condenser; an upper rectification column with a condenser for cooling use disposed in its top portion, the bottom portion of the upper column being opposite the reboiler-condenser of said lower rectification column; means for cooling each of said condensers for cooling use; means for pressurizing, cooling down, and gas-liquid separating a feed monosilane gas; means for introducing the pressurized feed gas obtained by the above means into said lower rectification column; and means for introducing the gas rectified in said lower rectification column into said upper rectification column; wherein a high pressure gaseous monosilane product or liquid monosilane product having an ultra high purity is taken out of the bottom portion of said upper rectification column.

BRIEF DESCRIPTION OF THE DRAWINGS

An embodiment of the present invention will be referring to the Figure which is an illustrative view of an installation for carrying out the ultra high purity monosilane producing method and unit according to the present invention.

DETAILED DESCRIPTION OF THE INVENTION

Figure 1:
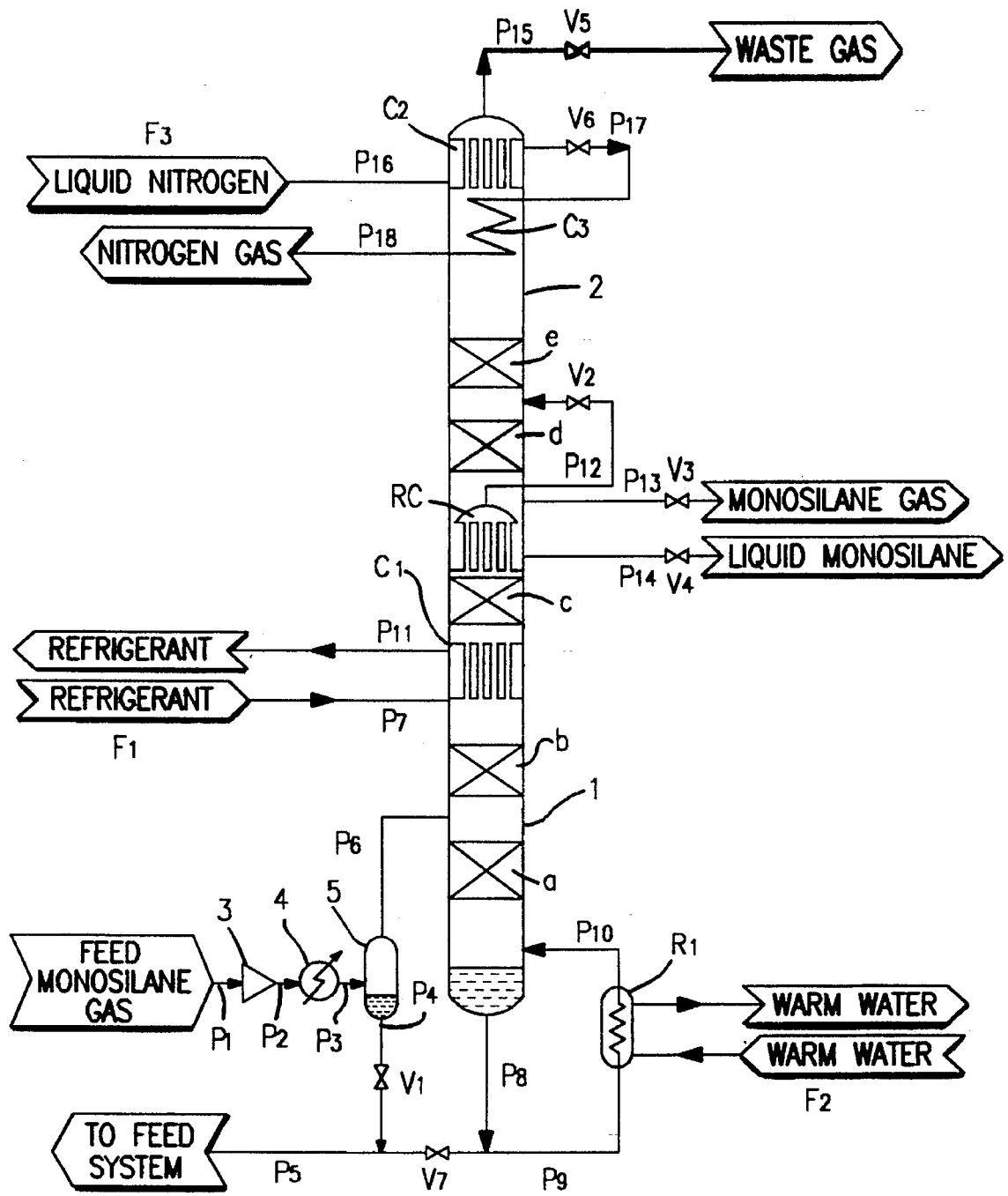

In the present invention, an impure monosilane gas is used as a feed.

The composition of a feed monosilane gas used in the embodiment of the present invention and the boiling points of its components are as shown in Table 1.

TABLE 1

| Composition of Feed Monosilane Gas | % | Boiling Points (°C. at 1 atm) |
|---|---|---|
| Hydrogen ($H_2$) | 16.0 | −252.9 |
| Monosilane ($SiH_4$) | 69.2 | −111.5 |
| Monochlorosilane ($SiH_3Cl$) | 4.1 | −30.4 |
| Dichlorosilane ($SiH_2Cl_2$) | 9.9 | 8.2 |
| Trichlorosilane ($SiHCl_3$) | 0.8 | 31.8 |

In the present invention, a double rectification column is composed of a lower rectification column 1 and an upper rectification column 2, where a reboiler-condenser RC is disposed in the top portion of said lower rectification column 1 and a condenser for cooling use $C_1$ is disposed under this reboiler-condenser RC. Besides, condensers for cooling use $C_2$ and $C_3$ are disposed in the top portion of said upper rectification column 2.

For instance, a feed monosilane gas having the composition given in Table 1 is introduced at a temperature of about 0 °C. and a pressure of about 2.5 $kg/cm^2G$ to a compressor 3 through a pipe $P_1$, where it is warmed to a temperature of about 40 °C. and pressurized to about 30 $Kg/cm^2G$. Then, the feed gas is introduced to a cooler 4 through a pipe $P_2$ so as to be cooled down to a temperature of about −20° C. while maintaining its high pressure, and its heavy fraction is consequentially liquefied. The resulting gas-liquid mixture is thereafter introduced to a gas-liquid separator 5 through a pipe $P_3$, where the heavy fraction is separated as a liquid. This liquid part will be returned for reuse to the feed system from the bottom portion of the gas-liquid separator 5 by way of a pipe $P_4$, a valve $V_1$ and a pipe $P_5$.

The gas remaining in the gas-liquid separator 5 is introduced at a temperature of about −20 °C. and a pressure of about 30 $kg/cm^2G$ between the rectifying portion a and rectifying portion b disposed respectively in the lower portion and middle portion of the lower rectification column 1 through a pipe $P_6$, and passed through rectifying portion b. Then, a part of the gas passed through the said rectifying portion b is condensed and liquefied in the condenser $C_1$ for cooling use which has been cooled at about −34 °C. by a refrigerant $F_1$ coming through a pipe $P_7$, and the resulting liquid is caused to flow down in the rectifying portion b as a reflux liquid so as to be subjected to gas-liquid contact with a rising gas.

As a result, the heavy fraction in the liquid passing through the rectifying portion b is concentrated and the light fraction in the gas also passing there is concentrated. The liquid which has flowed down through the rectifying portion b is further passed through the rectifying portion g, and reservoired in the bottom portion of the rectification column 1.

This reservoired liquid is passed through a pipe $P_8$ and a pipe $P_9$ and introduced to a reboiler $R_1$ heated by a heating source (warm water) $F_2$ so as to be evaporated, and the resulting gas is taken out therefrom through a pipe $P_{10}$ and introduced below the rectifying portion a.

After the refrigerant $F_1$ cools said condenser for cooling use $C_1$, it will be taken out of a pipe $P_{11}$ so as to be used in circulation.

The gas introduced below said rectifying portion a from said pipe $P_{10}$ rises through the rectifying portion a, where it is rectified in a gas-liquid contact with the liquid flowing down through the rectifying portion a. Furthermore, the gas which has risen through the rectifying portion a rises through the rectifying portion b after joining the gas coming from said pipe $P_6$. Then, a part of the gas is liquefied in the condenser for cooling use $C_1$ so as to be used as a reflux liquid in the rectifying portion b, and the remaining part thereof rises through a rectifying portion c disposed in the upper portion of said lower rectification column 1 and introduced to the reboiler-condenser RC, where almost all of a part of monosilane in the same gas and high boiling point materials including monochlorosilane are liquefied and the resulting liquid is used as a reflux liquid in the rectifying portion c, rectifying portion h and rectifying portion a. At the same time, liquid monosilane reservoired in the bottom portion of said upper rectification column 2 at a position adjacent the reboiler-condenser RC and low boiling point materials such as hydrogen contained in the liquid monosilane are evaporated, thereby increasing the purity of the liquid monosilane.

Then, the gas which has not been liquefied in the reboiler-condenser RC is taken out of its top portion through a pipe $P_{12}$, slightly reduced in pressure by means of a valve $V_2$, and introduced between a rectifying portion d and rectifying portion e respectively disposed in the lower portion and middle portion of the upper rectification column 2. Thus, the mixed gas of monosilane and hydrogen introduced in said upper rectification column 2 is passed through the rectifying portion e and cooled down by means of the condensers for cooling use $C_3$ and $C_2$ so that monosilane is liquefied. The liquefied monosilane is caused to flow down through the rectifying portion e and rectifying portion d, wherein the liquid monosilane becomes a reflux liquid in the rectifying portion e and rectifying portion d. This reflux liquid is rectified in contact with the gas rising from below, and reservoired at a pressure of about 30 kg/cm²G as high purity monosilane in the bottom portion of said upper rectification column 2 opposite the reboiler-condenser RC. From this portion, a high pressure gaseous monosilane product having an ultra high purity will be taken out through a pipe $P_{13}$ and a valve $V_3$ and a high pressure liquid monosilane product having an ultra high purity will be also taken out through a pipe $P_{14}$ and a valve $V_4$.

Hydrogen gas, not liquefied in the condensers for cooling use $C_3$ and $C_2$, is taken out of the top portion of said upper rectification column 2 through a pipe $P_{15}$, regulated in pressure by means of a valve $V_5$ and discharged as waste gas.

To said condenser for cooling use $C_2$, liquid nitrogen $F_3$ is introduced as a refrigerant through a pipe $P_{16}$. After the liquid nitrogen is evaporated in the condenser for cooling use $C_2$, it is taken out thereof through a pipe $P_{17}$, reduced in pressure by means of a valve $V_6$, and then used again as a refrigerant in the condenser for cooling use $C_3$. The resulting warmed nitrogen gas is taken out through a pipe $P_{18}$. Other refrigerants having a temperature of below $-80°$ C. or less, such as liquefied ethylene or liquefied methane, can be used as the refrigerant in the condenser for cooling use $C_2$.

In addition, valve $V_7$ is inserted between the pipes $P_5$ and $P_8$, which will be opened when a part of the liquid reservoired in the bottom portion of said lower rectification column 1 is desired to return to the feed system as required.

The ultra high purity monosilane producing method and unit according to the present invention are highly advantageous as mentioned above, i.e. capable of easily and continuously obtaining high pressure monosilane gas and high pressure liquid monosilane, each having an ultra high purity, and capable of making the whole of the producing plant compact because its dimensions are satisfactorily reduced in accordance with an extent of higher pressure, as compared with a producing plant for low pressure monosilane gas.

We claim:

1. A method of producing ultra high purity monosilane which comprises:

pressurizing, and partially condensing a feed monosilane gas;

separating the gas and liquid phases of the partially condensed feed monosilane;

introducing the gas phase to the middle stage of a lower rectification column (1) and rectifying the gas phase therein;

introducing a gas produced by this rectification to an upper rectification column (2) and rectifying the same gas there; and removing at least one of a high pressure monosilane gas product and liquid monosilane product having an ultra high purity which is produced by this rectification, from the bottom portion of said upper rectification column.

2. A method as claimed in claim 1, which comprises: warming a liquid reservoired in-the bottom portion of said lower rectification column (1) by means of a reboiler ($R_1$), whereby low boiling point components contained in said liquid are gasified so as to be recovered to the lower rectification column.

3. A method as claimed in claim 1, comprising providing refrigerant to a cooling means ($C_1$) at an intermediate level of said lower column (1).

4. An ultra high purity monosilane producing apparatus which comprises:

a lower rectification column (1) with a reboiler-condenser (RC) disposed in its top portion;

an upper rectification column (2) with a condenser ($C_2$) for cooling use disposed in its top portion, the bottom means for pressurizing (3), cooling (4), and partially condensing separating a feed monosilane gas;

means (5) for separating the gas and liquid phases of said partially condensed gas;

means ($P_6$) for introducing the gas phase into said lower rectification column (1); and means ($P_{12}$) for introducing the gas rectified in said lower rectification column into said upper rectification column (2);

wherein at least one of a high pressure gaseous monosilane product and liquid monosilane product having an ultra high purity is taken out of the bottom portion of said upper rectification column (2).

5. An apparatus as claimed in claim 4, comprising a cooling means ($C_1$) disposed in said lower column between the point of introduction of the gas phase and the reboiler-condenser (RC).

6. An apparatus as claimed in claim 5 wherein said cooling means ($C_1$) is a condenser.

* * * * *